R. S. BEAMISH AND H. G. SCHAEFER.
AUTO TRAILER.
APPLICATION FILED NOV. 30, 1917.
1,331,410.
Patented Feb. 17, 1920.
2 SHEETS—SHEET 2.
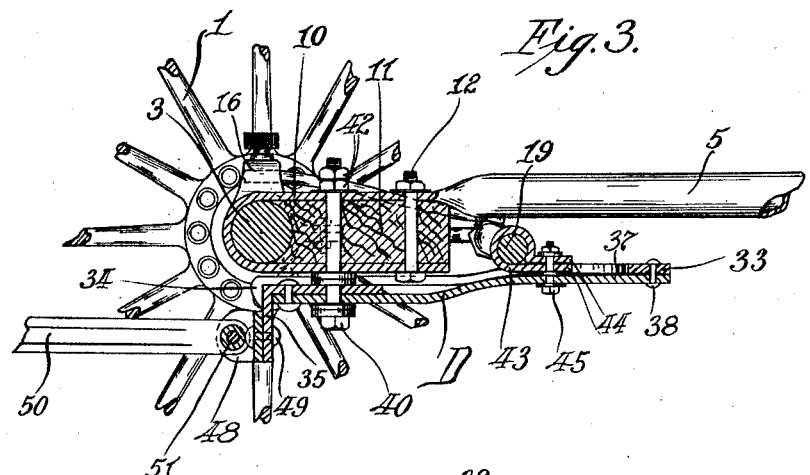
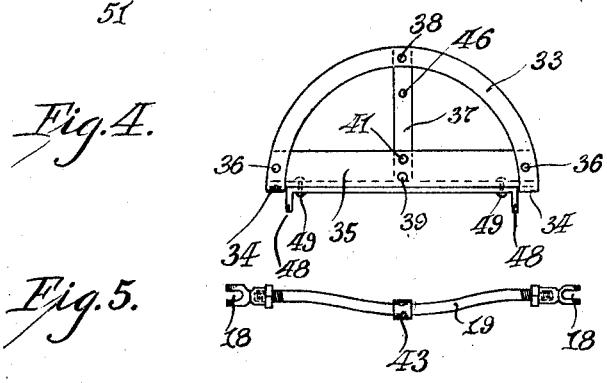
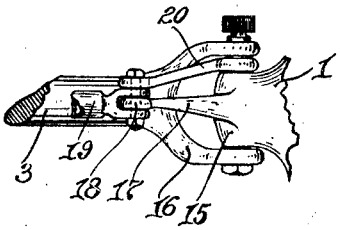
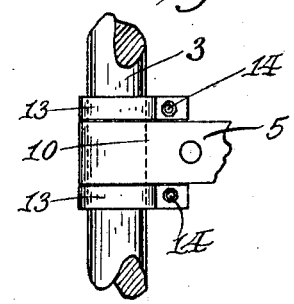
Inventors: Robert S. Beamish,
Herman G. Schaefer,
By Howard Finch,
Attorney.

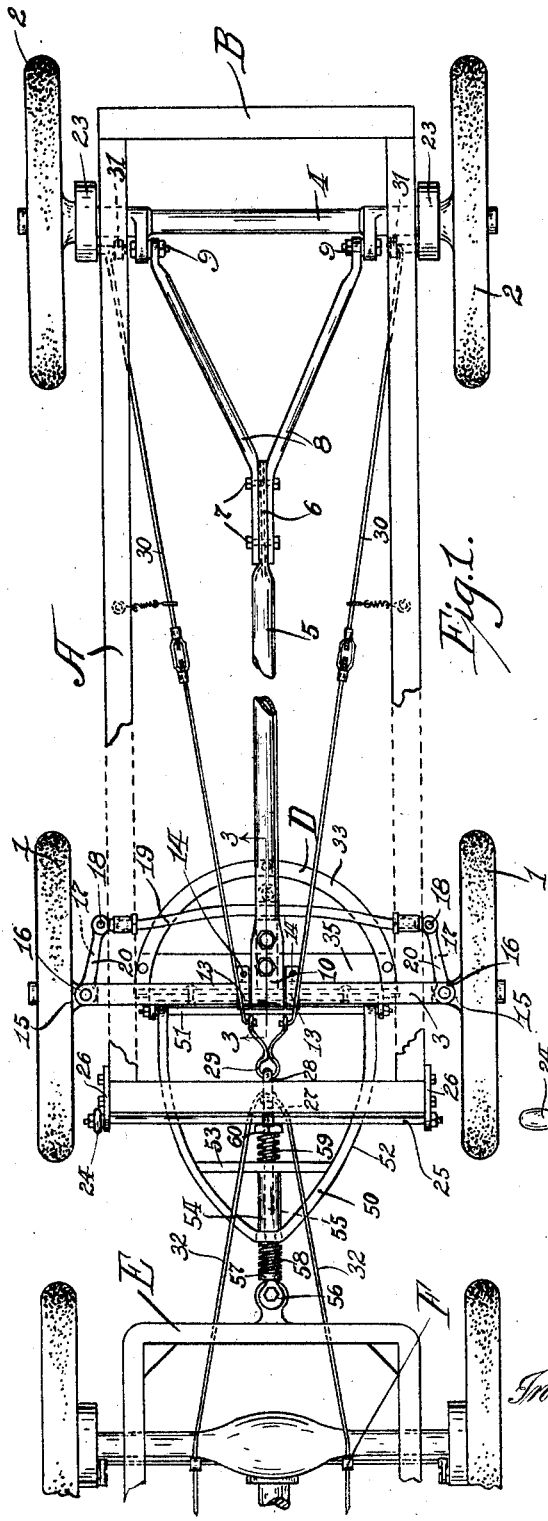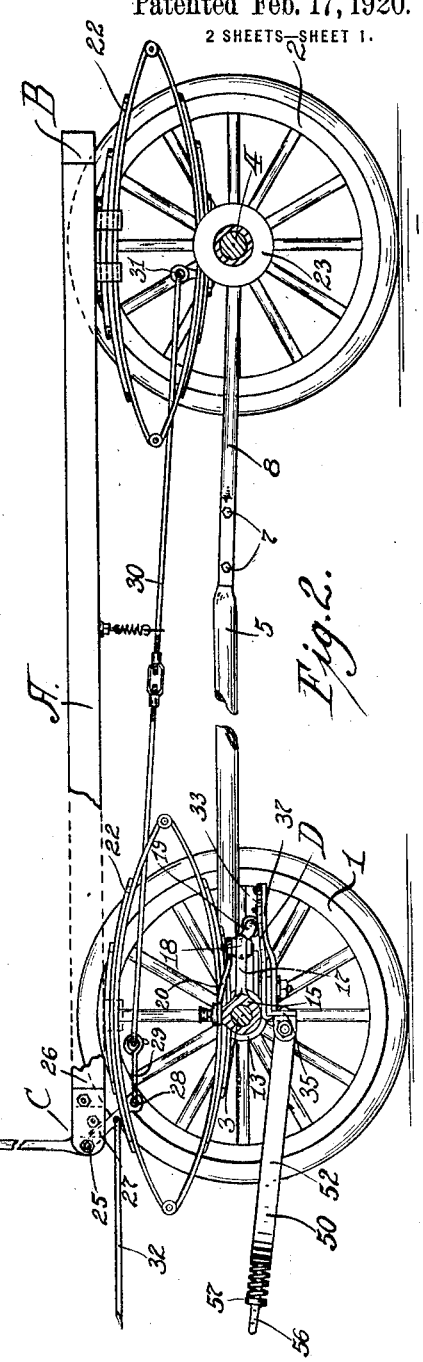

UNITED STATES PATENT OFFICE.

ROBERT S. BEAMISH AND HERMAN G. SCHAEFER, OF MINNEAPOLIS, MINNESOTA.

AUTO-TRAILER.

1,331,410.    Specification of Letters Patent.    Patented Feb. 17, 1920.

Application filed November 30, 1917. Serial No. 204,746.

*To all whom it may concern:*

Be it known that we, ROBERT S. BEAMISH and HERMAN G. SCHAEFER, citizens of the United States, residing at Minneapolis, in the county of Hennepin and State of Minnesota, have invented a new and useful Improvement in Auto-Trailers, of which the following is a specification.

Our invention relates to vehicle or automobile trailers which are adapted to be used primarily in connection with self propelled vehicles. The simplicity of the construction of our vehicle, together with the combination of parts, makes the trailer very durable, light in weight and easily handled in back of an automobile.

In using a trailer with an automobile, it is essential that the trailer be easily steered so as to follow the propelling or preceding vehicle and still be of a light durable construction to reduce the draft on the motor vehicle to a minimum. To this end, we have designed our trailer with a peculiar arrangement of parts having steering means which is durable for various uses and which will cause the trailer to track with the vehicle pulling it without swaying from side to side.

The principal objects and features will be clearly set forth in the following specification and claims.

In the drawing, Figure 1 illustrates a plan view of our trailer, a portion of which is broken away, attached to an auto.

Fig. 2 is a side elevation of our trailer, a portion of which is broken away.

Fig. 3 is a sectional detail of a portion of the trailer or vehicle taken on the line 3—3 of Fig. 1.

Figs. 4, 5, 6 and 7 are detail portions of the construction of the trailer.

In the drawing A represents a trailer having front wheels 1 and rear wheels 2 which are mounted in the usual way on the axles 3 and 4 respectively. The front axle 3 is connected with the rear axle 4 by the reach 5 which is made preferably of tubing being flattened at 6 and connected by means of the bolts 7 to the hounds 8. The hounds 8 are secured to the rear axle 4 by means of the bolts 9.

The reach 5 is flattened on its forward end so as to form a U shaped portion 10. The U shaped portion 10 of the reach 5 engages the front axle 3 and the axle 3 is held in the U shaped member by means of the block 11 which is formed of any suitable material and is held by the bolt 12. The block 11 is of such dimension as to engage firmly against a portion of the axle to hold the same rigidly in the U shaped portion 10 and the bolt 12 clamping the block 11 between the ends of the U shaped portion 10. The block 11 is of the same width as the flattened U shaped portion 10. The bands or collar 13 positioned on either side of the forward end of the reach 5 and rigidly secured to the axle 3 by means of the bolts 14, hold the forward end of the reach 5 centrally on the axle 3. It is understood, however, while it is not illustrated in the drawings, that the forward end of the reach 5 can be rigidly secured or bolted to the axle 3 in the ordinary manner.

Steering knuckles 15 are pivotally secured to the fork ends 16 of the axle 3 in the usual manner and their operating arms 17 pivotally connected at 18 to the tie or parallel rod 19, thereby connecting the steering knuckles together by the tie rod 19. An additional arm 20 is provided which is similar in function to the arm 17 and is connected to the steering knuckle bolts and the bolt connecting the ends of the arm 17 to the rod 19.

The trailer A is provided with a frame portion B which is of ordinary construction and is connected with the front and back axles by means of four springs 22 in the ordinary manner, the frame B being only illustrative and it being understood that any shape or style body or box can be attached to the running gear. The rear wheels 2 are provided with band brakes 23 which are of ordinary construction and which are operated by means of the operating mechanism C. The mechanism C is composed of the hand operating lever 24 which is rigidly secured to the transverse rod 25 and the rod 25 is pivotally connected to either side of the forward end of the frame B by means of the brackets 26. An arm 27 is rigidly secured to the central portion of the rod 25 on one end and is formed with an eye 28 on its other end in which the bifurcated link 29 is connected. The link 29 is connected by means of the rods 30 to the brake operating levers 31 so that when the handle 24 is drawn backward, the brake arms 31 will be operated and the brakes 23 act upon the brake drums of the wheels 2 in the usual manner to retard the movement of the trailer. When the trailer A is used in connection with an automobile E and is secured thereto, as illustrated in Fig. 1, the link 27 is adapted to be connected to the brake rods or mechanism of the auto or propelling vehicle E by means of the cables 32, one end of which is connected to the link or lever 27, and the other end connected to the brake mechanism F of the auto E.

The steering knuckles and tie rod which constitute a portion of the steering mechanism of the trailer, are operated by the steering mechanism D. The mechanism D is composed of a semicircular member 33 having its ends 34 turned down and is secured to a diametrically extending angle plate 35 by the rivets 36. The member 33 is provided with a centrally positioned and radially extending member 37 which is rigidly secured on one end to the member 33 by the rivet 38 and on the other end to the angle member 35 by the rivet 39. The member 33 is pivotally secured to the reach 5 by means of the bolt 40 which extends through the opening 41 in the angle member 35 and through an opening formed in the block or spacing member 11. The bolt 40 being held in position by means of the nuts 42.

The member 33 is pivotally connected to the tie rod 19 by means of the collar 43 which is rigidly secured to the tie rod in any suitable manner such as brazing or welding. The collar 43 is formed with extending ends 44 through which the bolt 45 passes freely. The bolt 45 also passes freely through the opening 46 formed in the member 37; thereby pivotally connecting the tie rod 19 to the member 33.

Secured to the vertical side of the angle plate 35 is a pair of ears 48 which are held rigidly to the plate by the rivets 49 or any other suitable means. A draft tongue 50 formed of channel iron is pivotally connected to the ears or connections 48 by means of the rod 51 which is of ordinary construction. The draft tongue 50 is substantially V-shaped with bowed sides 52. A transverse brace 53 is rigidly fixed between the sides 52 and extends across the tongue 50 near its forward end. A tube 54 is rigidly fixed between the brace 53 and the forward end or apex of the tongue 50 so as to form a guideway for the bolt 55 which passes freely through the same. The bolt 55 is formed with an engaging eye 56 on its forward end and a collar 57 just back of the eye. A coil spring 58 is positioned on the rod 55 and is interposed between the collar 57 and the extreme forward end of the tongue 50. The bolt 55 is long enough so that it projects beyond the brace 53 and the projecting portion of the same has a coil spring 59 which is held in position on the bolt by the nuts 60. By means of the nuts 60, the tension of the springs 58 and 59 can be adjusted so as to hold the bolt 55 to the tongue with the desired tension on the springs 58 and 59. One of the nuts 60 acts as a lock nut after the adjustment is made. Thus the springs 58 and 59 act as cushions in the use of the trailer A as they will eliminate a good deal of the jar and jerk on the trailer when the same is attached to the auto E. The spring 59 acts as the cushion in the forward pull of the auto and the spring 58 cushions the trailer connection in stopping.

In use, when the tongue 50 is attached to a motor vehicle E, such as is illustrated in Fig. 1, the tongue 50 will not only serve as the connecting link between the trailer and the motor vehicle but will operate the steering mechanism D which is pivotally connected to the trailer and thereby steer the wheels 1 in substantially the same direction as the motor vehicle is proceeding. The cushions formed by the springs 58 and 59 take off the jar and jerk in stopping and starting as is so often necessary in the use of a trailer through crowded streets.

The mechanism D is very compact and simple and it will be noted it is entirely within the bounds of the front axle and directly under the forward end of the reach, out of the way so that a very short draft tongue can be used, still in operation, it is very effective without any lost motion. When the segment or member 33 is moved by the tongue 50 in a horizontal plane in either direction, from the central position, as illustrated in Fig. 1, the tie rod 19 together with its connecting parts, is moved in the direction in which the tongue is turned.

In making a trailer after the construction illustrated, it is evident that the same can be made lighter and still be very durable in use. The axles 3 and 4 are fixed parallel to each other to the frame portion B thus simplifying the construction of the trailer materially.

The braking mechanism C is so constructed that it can be operated either on the trailer or by the operation of the brakes on the preceding vehicle. By connecting the cables 32 to the braking mechanism F of the preceding vehicle in any suitable manner, only a portion of the auto E being illustrated in the drawings, as the connecting means of the cables with the braking mechanism of the same would be of ordinary construction. By connecting the braking mechanism of the trailer A with the preceding vehicle a very important result is accomplished, as in the use of the trailer in descending any grades, where the trailer is heavily loaded, it might be very disastrous if brakes were not applied. In the use of our device where the braking mechanism of the trailer is connected with the mechanism of the preceding vehicle, when the preceding vehicle brake mechanism is operated, the brake mechanism of the trailer is simultaneously operated, thereby governing the trailer automatically from the preceding vehicle. The steering construction or mechanism D of our trailer, together with the coupling or draft tongue, allow the trailer to be connected very closely to the automobile and still afford easy turning of the same which is a very desirable feature in trailers.

In accordance with the patent statutes, we have described the principles of operation of our invention, together with the apparatus which we now consider to represent the best embodiment thereof, but we desire to have it understood that the construction is only illustrative and that the invention can be carried out by other means and applied to uses other than those above set forth within the scope of the following claims:

1. In a trailer having front and rear axles, a reach detachably connected to the front axle, hounds detachably connecting said reach with the rear axle, steering means connecting the steering wheels of said trailer, a semicircular member positioned below the forward end of said reach, an angle plate fixed to the ends of said semicircular portion, a radius arm centrally connected to said semicircular member and said angle member, means pivotally connecting said radius arm to said reach to hold said semicircular member pivotally below said reach, means pivotally connecting said steering means to said radius arm back of said pivot point which holds said semicircular member, the diameter of said semicircular portion and the length of said angle plate being approximately the same as the length of the front axle and a draw tongue connected to said angle member which is adapted to pull said trailer and operate said steering means.

2. In a trailer, having front and rear axles, a reach rigidly connected to the front axle, hounds rigidly connecting said reach with the rear axle, steering means connecting the steering wheels of said trailer, a semicircular member positioned horizontally below the forward end of said reach and pivoted back of said front axle to said reach, a radius arm centrally fixed to said semicircular member, means connecting the steering means of the steering wheels to said radius arm, an angle plate fixed to said semicircular portion and a tongue connected to said angle plate whereby when said tongue is attached to a preceding vehicle, said trailer can be drawn back of the same and said semicircular portion rotated on its pivot point to simultaneously operate the steering means of said trailer, to steer said trailer in the same direction as the preceding vehicle.

3. A trailer having front and rear axles fixed parallel to each other, a reach detachably connected to said front and rear axles, a semi-circular steering member pivotally attached to and held below said reach, an angular member connecting the forward ends of said semi-circular member and adapted to receive a draw tongue and means connecting said semi-circular member with the steering knuckles of the front wheels of said trailer, whereby when the draw tongue is connected to said angular member it is adapted to move said semi-circular member in a direction to steer said trailer.

4. A trailer, including front and rear axles held parallel to each other, a detachable reach connecting said axles, a semi-circular steering member having a radially extending arm, an angular member connecting the forward ends of said semi-circular member so as to extend across the diameter of said semi-circular member, means pivotally connecting said semi-circular member through said angular member and radially extending member so as to hold said semi-circular member with said angular member directly below and in line with the front axle of said trailer, means connecting said semi-circular member with the steering knuckles of the front wheels of said trailer and a draw tongue connected to said angular member, whereby said trailer can be pulled and simultaneously steered by said semi-circular member.

5. The combination with a trailer, including a steering means, comprising a semi-circular member pivotally held below the front axle and reach of said trailer so as to extend horizontally below the reach, an angle member extending across the diameter or said semi-circular member, a radially extending arm centrally positioned in said semi-circular member, steering means connected to said radial arm and to the front wheels of said trailer and a draw tongue pivotally connected to said diametrically extending angular member, said angular member being positioned directly below the front axle of said trailer.

ROBERT S. BEAMISH,
HERMAN G. SCHAEFER.